United States Patent [19]

Manganaro

[11] Patent Number: 4,991,625
[45] Date of Patent: Feb. 12, 1991

[54] MULTIPLE STREAM FLUID MIXING AND DISPENSING APPARATUS

[76] Inventor: Paul R. Manganaro, P.O. Box 535, Coopersburg, Pa. 18036-0535

[21] Appl. No.: 448,639

[22] Filed: Dec. 11, 1989

[51] Int. Cl.⁵ .............................................. F17D 3/01
[52] U.S. Cl. .................................... 137/606; 251/26; 251/43; 251/46; 251/611; 222/144.5
[58] Field of Search ............................ 222/144.5, 145; 137/606; 251/26, 43, 46, 61.1

[56] References Cited

U.S. PATENT DOCUMENTS

| | | | |
|---|---|---|---|
| 3,022,798 | 2/1962 | Taylor | 137/606 |
| 3,685,541 | 8/1972 | Caparone et al. | 137/606 |
| 3,750,701 | 8/1973 | Botnick | 137/606 |
| 3,756,276 | 9/1973 | Katva | 137/606 |

Primary Examiner—Andres Kashnikow
Assistant Examiner—Philippe Derakshani
Attorney, Agent, or Firm—Sanford J. Piltch

[57] ABSTRACT

An improved multiple stream, fluid mixing and dispensing apparatus for automatically regulating flow rate and temperature for one or more preset fluid flows for connection to domestic water delivery systems including a plural station, fluid flow rate and temperature control console adapted for cooperating with the standing hydraulic pressure of a dual temperature fluid supply means with a variable effluent flow rate regulator interposed in each of the main supply conduits and associated controller means for presetting the flow rate through each regulator and determining both the degree of mixing and the incidence of fluid flow to be provided from each supply conduit to the exit conduit.

14 Claims, 4 Drawing Sheets

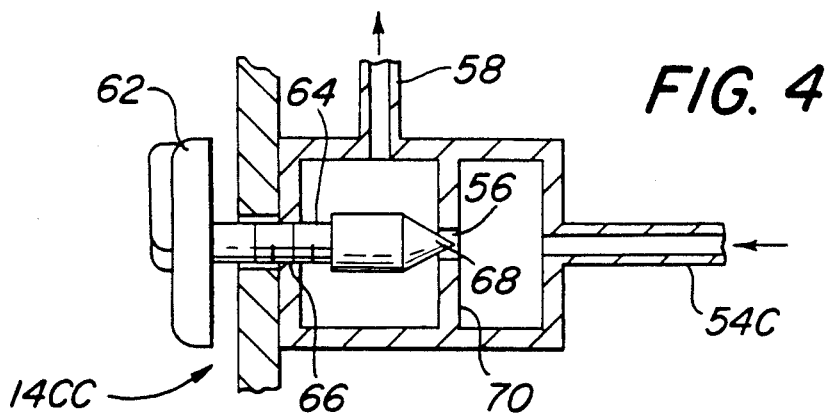
FIG. 4
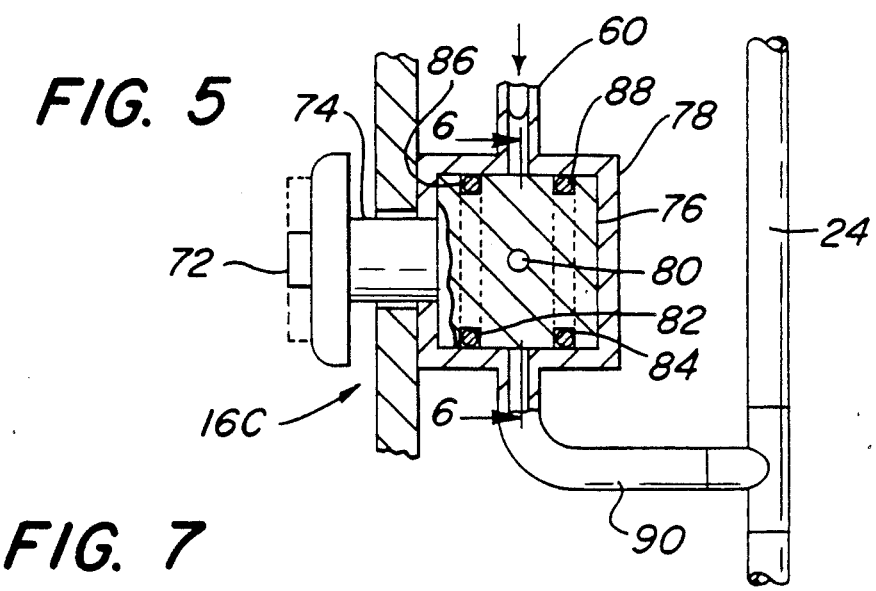
FIG. 5
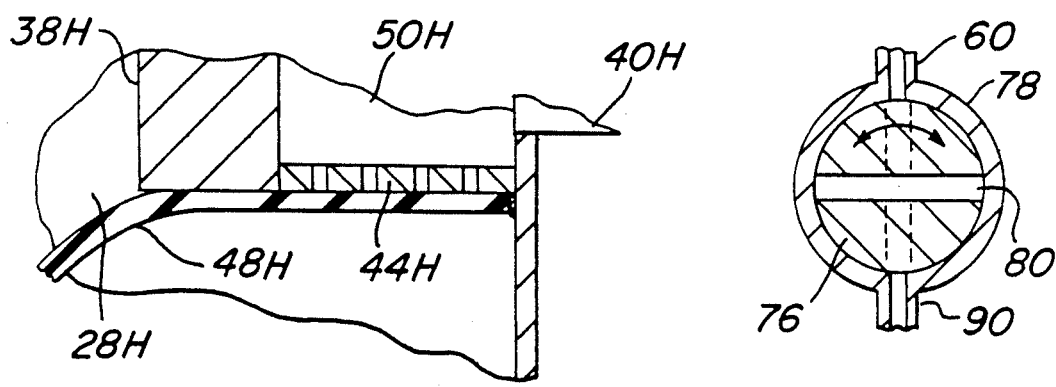
FIG. 7
FIG. 6

MULTIPLE STREAM FLUID MIXING AND DISPENSING APPARATUS

TECHNICAL FIELD OF THE INVENTION

This invention relates to a touch-accuated fluid dispensing apparatus providing plural fluid streams on demand.

BACKGROUND OF THE INVENTION

Systems exist for controlling the temperature and flow rates of fluids for various purposes. Systems also exist for mixing two miscible fluid streams to obtain a desired working temperature or other combination of physical properties. Push-button mixing valves are known to have been used for such purposes. In residential water uses, the flow rate and temperature of the mixed stream must be set and balanced each time a user steps up to the faucet for a special need. There are everyday situations where a system tailored to provide residential water for a particular application would be most convenient, especially if such a tailored condition fluid stream could be made available at the touch of a knob.

A primary objective of the present invention is to provide a control console that is simplified and compact and will, on demand, provide any of a number of discrete fluid streams, each having a predetermined temperature and flow rate.

Another object of the invention is to provide a device having a number of dial-actuated elements, controlling fluid flow which have been preset for a variety of use conditions.

Still another object is to provide a regulator system whereby a fluid of the same mixture and temperature is delivered each time at the common faucet when a specific ON-OFF knob is actuated.

Other objects will appear hereinafter.

SUMMARY OF THE INVENTION

The present invention is an improved multiple stream, fluid mixing and dispensing apparatus, displaying advantages over prior structures and a versatility as described above and following. The present invention includes an alternate means for effecting the vital main flow stream regulation.

The first embodiment of the invention comprises a plural station, fluid flow rate and temperature control console adapted for cooperating with the standing hydraulic pressure of a dual temperature fluid supply means.

This embodiment of the present invention comprises two main fluid supply conduits, a single fluid exit conduit interruptably connectable to both of said main supply conduits, a variable effluent flow rate regulator interposed in each of the main supply conduits, bypass fluid supply conduits operably connected to each of the main fluid supply conduits and to the interposed flow rate regulator, an ancillary fluid outlet conduit connected to said regulator serving as a signal control fluid supply means, and at least one or more associated controller means for presetting the flow rate through each regulator and determining both the degree of mixing and the incidence of the fluid flow to be provided from both of said supply conduits to the exit conduit.

Each of the flow rate regulators has a rigid impermeable main chamber connecting a first section with one of the main fluid supply conduits and with the fluid exit conduit. Also the bypass fluid supply conduits are operably connecting between each of the main supply conduits and a second section of the main chamber of the interposed flow rate regulator.

The main chamber is provided with a first fluid valving means comprising an internally disposed, perforated support means upstream of said fluid exit conduit, and a flexible fluid-impermeable membrane securely arranged across said main chamber separating said first and second sections thereof and adapted to seat sealingly, either fully or partially, over said perforated support means. The membrane is responsive to the differential pressures created on the opposing sides of the membrane by the dissimilar flow pressures emanating from the fluids in the main fluid supply conduit and the bypass fluid supply conduit.

An associated controller means is adapted for setting the regulator main flow rate and includes a first multi-setting flow valve means disposed downstream in the signal control fluid supply means. A second valving means is connectably disposed downstream of the first multisetting valve for "ON" or "OFF" modes of operation. The second valving means is also connected to a companion second multisetting flow valve means for the other signal control fluid supply means of the other main fluid supply and also to the main exit conduit which second valving means serves as a common flow control valve for the mixed fluid streams.

A second embodiment of the present invention comprises the plural station flow control console described just above including all the described assemblies and components, except for the configuration of the variable effluent, flow rate regulator interposed in each of the main supply conduits. The alternate means for the regulator assembly is one in which the main chambers have an internally disposed perforated plate means located in a wall intermediate and separating the main fluid supply and fluid exit conduits. The intermediate wall along with the perforated plate means forms a cylindrical compartment in cooperation with the main chamber sidewall enclosing a disk-like piston adapted to reciprocate in said cylindrical compartment. The piston moves between full-flow and no-flow positions relevant to one or more outflow ports in said perforated plate means, with the position of the piston being responsive to the differential pressures created on the opposing planar surfaces of said piston by the dissimilar flow pressures emanating from the main fluid supply conduit and the bypass fluid supply conduit.

Each of the flow rate regulators is provided with a manually adjustable needle valve located in the bypass fluid supply conduit for calibrating the desired pressure drop occurring in the supply fluid passing therethrough to the main chamber of the regulator. Each of the regulators also includes at least one associated controller means downstream for setting the fluid flow rate and temperature of the mixed fluid flow.

The flexible membrane is composed of an elastomeric material which is resistant to high temperature fluid contact and to cyclical and flexible seating. The membrane is also responsive to multiple pressure differentials exerted thereon. The disk-like piston is composed of a plastic material resistant to high temperature fluid contact and to reciprocating frictional contact. The piston is also responsible to multiple pressure differentials exerted thereon.

The associated controller means for each embodiment includes first and second multisetting flow valve means comprising manually adjustable, needle-throttle and orifice type valves with plural settings ranging from minimal signal fluid flow to full signal fluid flow. The associated controller means also includes a second valving means with a manual control knob for rotating the valve body between flow and no-flow modes on demand.

BRIEF DESCRIPTION OF THE DRAWING

For the purpose of illustrating the invention, there are shown in the drawings forms which are presently preferred; it being understood however, that the invention is not limited to the precise arrangements and instrumentalities shown.

FIG. 4 is a side view of a vertical section through one of the flow setting control assemblies of the present invention, taken along line 4—4 in FIG. 2.

FIG. 5 is a side view of a vertical section through one of the centrally disposed, ON-OFF, flow valve assemblies, taken along line 5—5 in FIG. 2.

FIG. 6 is a front view of a vertical section of the cylindrical valving mechanism portion of the ON-OFF flow assembly taken along line 6—6 in FIG. 5.

FIG. 7 is a fragmentary view of the valving means for the main flow rate regulator of FIG. 3.

DETAILED DESCRIPTION OF THE PREFERRED EMBODIMENTS

The following detailed description is of the best presently contemplated modes of carrying out the invention. This description is not intended in a limiting sense, but is made solely for the purpose of illustrating the general principles of the invention.

Figure 1:
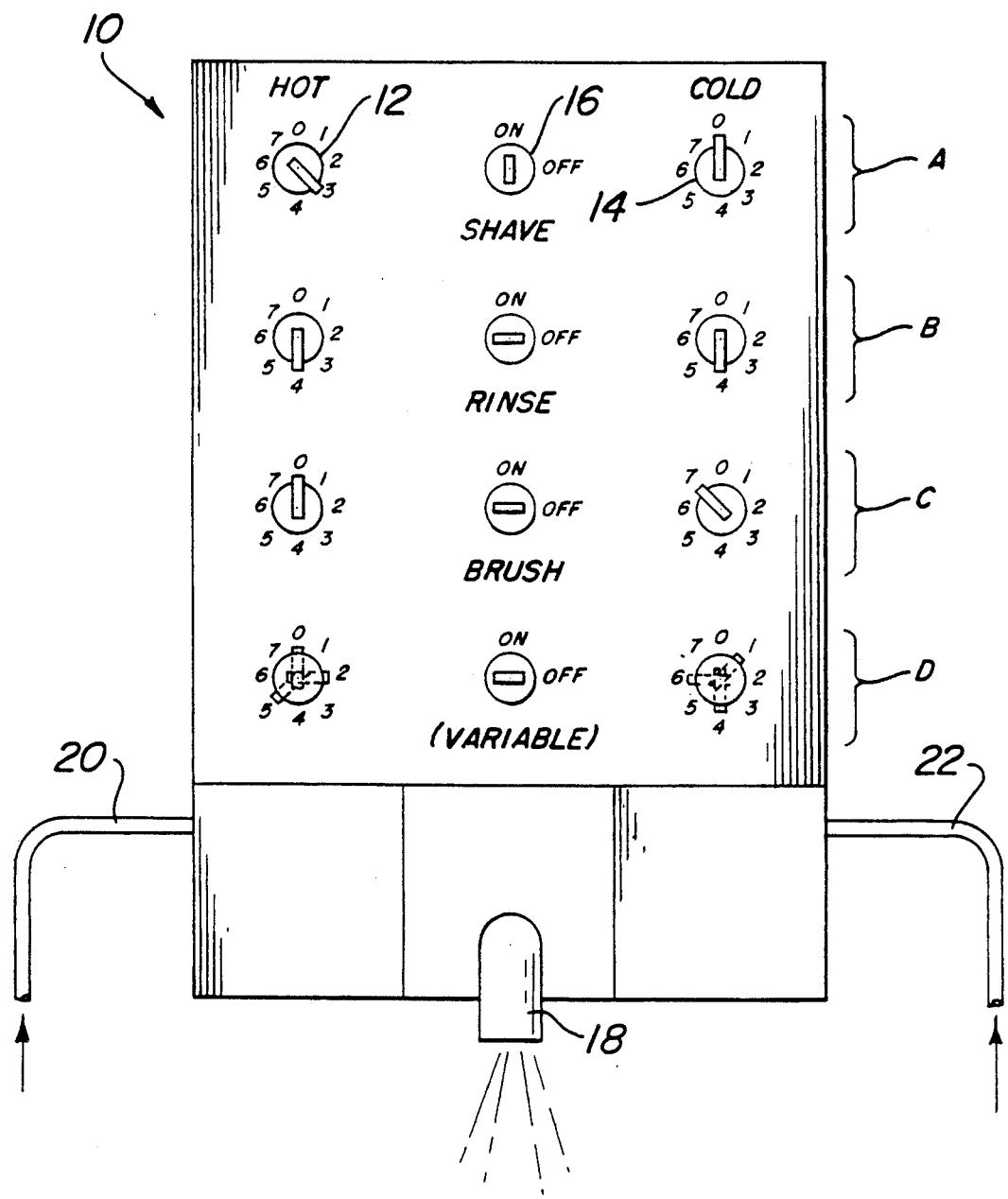
FIG. 1 is a front schematic view of a control console and fluid piping system of the liquid mixing and dispensing device of the present invention.

Referring now to the drawings in detail, wherein like numerals represent like elements, there is depicted in FIG. 1, the front panel of the control console, generally 10, showing the operating dials of the variable temperature-flow rate mixing device of the present invention. Control panel 10 has mounted thereon a plurality of adjustable flow setting control dials. These are conveniently arrayed in horizontal groups, A to D; for example, hot fluid presettable automatic control valve 12, cold fluid presettable automatic control valve 14, and associated ON-OFF manual valve 16. Each group will function to provide a preregulated, fluid flow (as to both temperature and flow rate) from the common faucet 18. The main hot and cold water inlet conduits, 20 and 22, respectively, are depicted as operatively connecting with control console 10 in a manner now to be described.

The uppermost group of dials, Group A, may be programmed to provide water at shaving temperature, i.e., slow stream or flow rate, hot water. The next lower linear group of dials, Group B, may be programmed to provide, at a touch, rinsing temperature water, and the second lower group of dials, Group C, programmed to provide, tooth brushing temperature water. The mixed stream flow rate for each group is also adapted to be preset, by adjusting either side dial settings. The lowermost group of dials, Group D, is included by way of illustration for a fourth fluid stream, preset if that should be desired, and tailored for variable flow and temperature levels.

An example will be described for the uppermost station Group A in regard to FIG. 1. Choosing to have a low flow rate stream of the hottest water only for shaving purposes emanating from faucet 18 at a touch, the user will move control valve 12 to the "3" position and concurrently set cold water control valve 14 to the "0" position. These settings are semi-permanent and thenceforth, actuation of the central on-off valve 16 only will be needed to produce shaving quality hot water, at a touch. The other three groups of dials are likewise presettable to provide dissimilar fluid streams, as are called for by the particular customs of the user.

Referring to the shaving water control group of dials A, with the hot control being set at "3", this will allow a moderate stream of the hottest water to pass through the panel piping system to the faucet 18, while the "0" setting on the cold control allows no water to pass through that position of the piping system.

Figure 2:
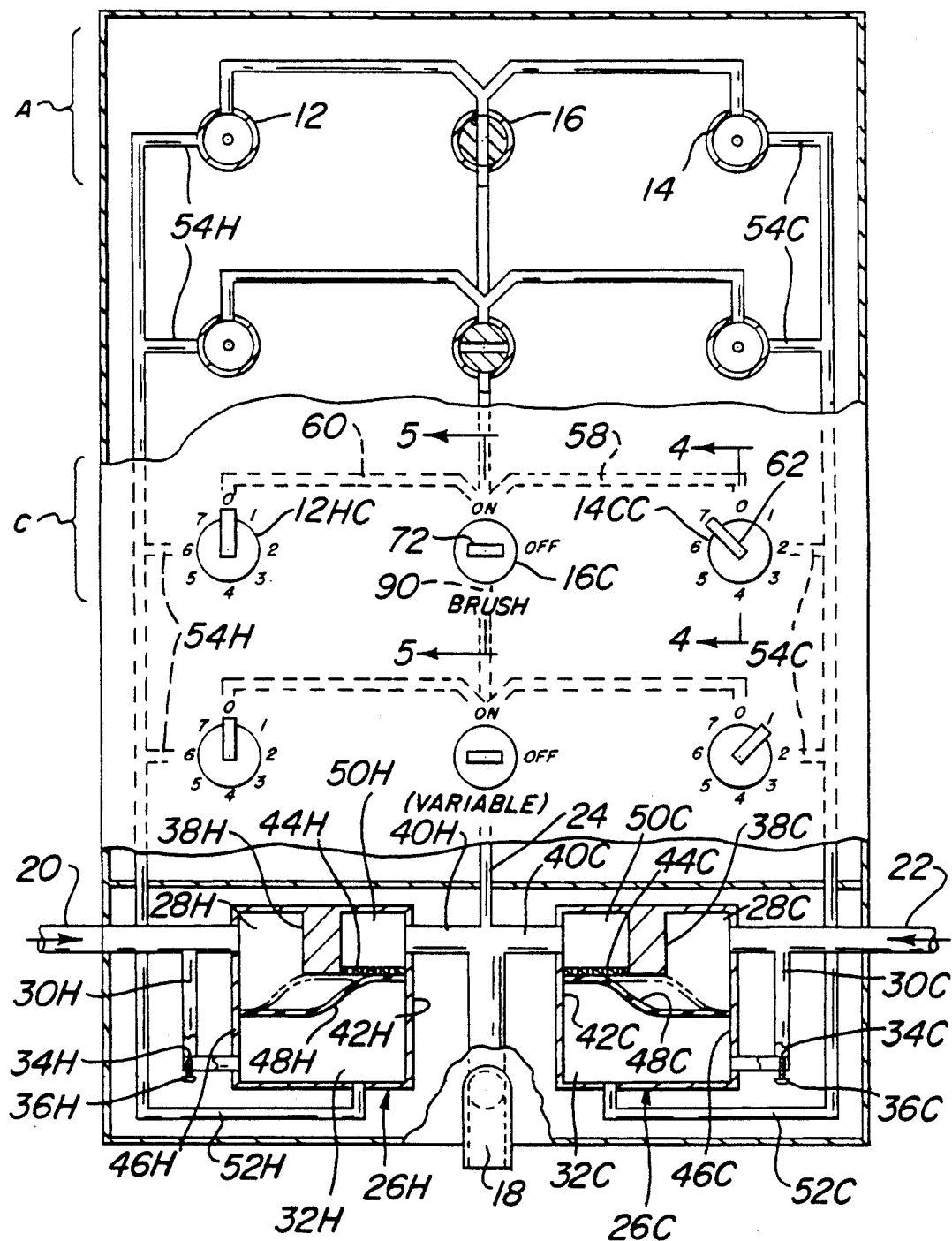
FIG. 2 is a partially broken away sectional front view of the normally enclosed mixing console of the present invention (with the cover panel remaining partially in place), depicting the operating elements of the device.

Referring now to FIG. 2, the aforedescribed dial functions, their integral associated controller valves, the associated piping, and the common flow rate regulator for the hot water and cold water main lines will be described. The two water mains enter identically configured flow rate regulators, 26H and 26C, respectively. The "H" and "C" characters as used herein indicate connections to the "hot" and "cold" main supplies and control regulators, and are used for ease of understanding flow and signal control lines in the present invention.

Looking first to the hot side regulator 26H, main fluid supply conduit 20 connects with an inlet chamber 28H of the regulator 26H. A bypass conduit 30H connects between inlet line 20 and the main control chamber 32H of regulator 26H. Disposed in the bypass conduit 30H is a needle-regulated, constrictable orifice 34H, the aperture of which is determined by the adjustable setting of the threaded needle. The aperture setting of the bypass valve 36H is arranged upon initial erection of the control panel and link up with the site plumbing system. It is used to compensate for the varied standing pressure heads in various locales. The aperture position will provide a fairly uniform inlet fluid pressure (generally below the inlet line pressure due to inherent pressure drop) to the control chamber 32H.

Regulator 26H is provided with an inwardly projecting, partial partition wall 38H located intermediate the main inlet 20 and main outlet conduit 40H. Securely mounted between partition wall 38H and the control chamber distal wall 42H is a perforated rigid support means 44H, which will permit fluid communication between the main inlet 20 and outlet conduit 40H and provide support and seating of a valving membrane 48H. Located substantially horizontally between opposing side walls 42H and 46H, and secured intermediate of their vertical length is the flexible, fluid-impermeable membrane 48H. It is adapted to move between a full closure position against the perforated support means 44H (shown in phantom) or to the partially open position shown in FIGS. 2 and 3.

The differential fluid pressures exerted on opposing sides of the membrane 48H will determine the membrane valving effect, and thus, how much fluid moves through the regulator 26H via outlet chamber 50H and conduit 40H to the faucet 18. Consequently, the fluid volume resident on the underside of membrane 48H can escape only via return outflow line 52H linked to the signal conduits 54H.

The hot inlet side conduit 54H, which is operatively linked to each such hot-side valve, is the self-denominated signal conduit supply and is also operably connected to outflow line 52H of hot fluid flow regulator 26H (FIG. 2). Similarly, the cold inlet side conduit 54C is connected via line 52C with controller 26C. (Elements in regulators 26C and 26H ending with the indicators "C" and "H" have identical functions in said regulators and further description is deemed unnecessary.)

The configuration of one of the dialable valving assemblies is better seen in the sectional view of FIG. 4. There is shown a threaded needle-type valve, 14CC, which controls the aperture of its variable orifice 56. A "0" setting of the valve 14CC indicates no fluid flow through the assembly and a "7" setting on said valve would correspond to maximum fluid flow through the valve. The upper oriented outflow line 58 of valve 14CC joins with opposing outflow line 60 of valve 12HC in a Y-union (See FIG. 2). The commingling signal fluid flows from the valves 12HC and 14CC enter the associated central on-off flow valve 16C. In control group C, the valve 16C is depicted in the no-flow mode, while the uppermost central on-off valve 16 (FIGS. 1 and 2) is depicted in the alternate combined stream flow mode. The intervening central on-off valve is closed.

The dial-settable valve assembly, such as right side control valve 14CC of group C, is adjusted as follows. As shown in FIG. 4, the external manual knob 62 is adapted to by rotating to any of eight settings (0 to 7). Due to the moving engagement of its threaded shaft 64 within tapped valve wall 66, a single clock-wise rotation (360°) of knob 62 will move the tapered needle cone 68 along an axial path into and out of intermediate orifice 56 which is located in axial alignment through the wall 70 separating the inlet and valve chambers of the valve body. This movement of the knob 62 reciprocally moves the needle cone 68, and correspondingly the valve 14CC, between closure and full flow settings.

As depicted in FIG. 4, the needle cone 68 is partially spaced apart from orifice 56. For example, if the dial setting of the knob 62 were at "3", this setting would permit fluid from signal supply line 54C to enter valve 14CC and exit via conduit 58 at a particular flow rate. Connection with the central on-off valve 16C (FIG. 2) exerts hydrostatic pressure whether or not the latter valve is in the flow position. The fabrication and calibration of such digitally modulated valves is known by those having skill in the valving art and further description is not deemed necessary.

With reference to FIG. 5, there is shown a sectional view of the centrally disposed on-off valve 16C (shown in the no flow mode). This corresponds to the observed "off" setting of the corresponding knob 72 in the BRUSH liquid dispensing system (group C) on the front panel of the console in FIG. 1. The pinned shaft 74 of knob 72 is secured to a cylindrical valve body 76 which is rotatably enclosed by casing 78. A single diametrically aligned passage 80 fully through the center of the valve body is provided, being positioned horizontally (as shown) so as to prevent fluid flow through this on-off valve. The cylindrical periphery of valve body 76 is provided with a pair of spaced-apart, circumferential grooves, 82 and 84, which straddle passage 80. Each groove carries a resilient elastomeric O-ring, 86 and 88, for insuring the hermetic sealing of the valve. As shown, there is no fluid flowing from inlet conduit 60 (the confluence of the outlet lines 58 and 60) to outlet conduit 90, so long as the knob is maintained in the depicted alignment of passage 80. Rotation of external knob 72 to the vertical position (as shown in phantom) would rotate passage 80 into vertical alignment with the tube inlet conduit 60 and outlet conduit 90, permitting a mixed fluid flow in accordance with the fluid flow settings of the valves 12HC and 14CC.

The vertical sectional view of FIG. 6, depicts the internal configuration of the on-off valve 16C. Passage 80 is seen in the horizontal (non-flow) mode preventing fluid from exiting to its lower outlet 90 to the common outlet line 24 connecting to the faucet 18. It is easily rotatable 90° to the flow mode by turning knob 72 (FIG. 5).

The fragmentary view of FIG. 7 depicts the valving means for the main regulator in the alternate position of the flexible membrane being fully closed, thereby blocking all main fluid flow via exit conduit 40C to common faucet 18. Membrane 48H is in sealing contact with perforated support means 44H, blocking fluid flow from chamber 28H into exit chamber 50H, and thus precluding any flow via exit conduit 40H to common faucet 18 (FIG. 3).

Figure 3:
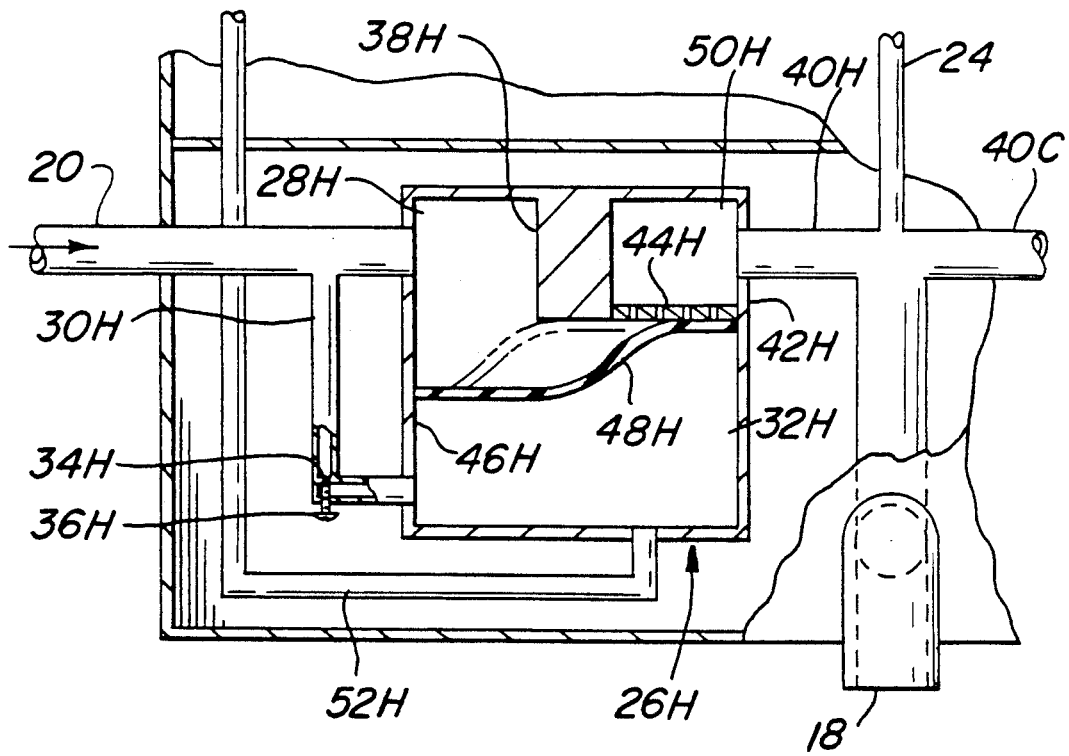
FIG. 3 is a broken-away, fragmentary (enlarged) view of the liquid flow regulator assembly as shown in the lower left quadrant of FIG. 2.
Figure 8:
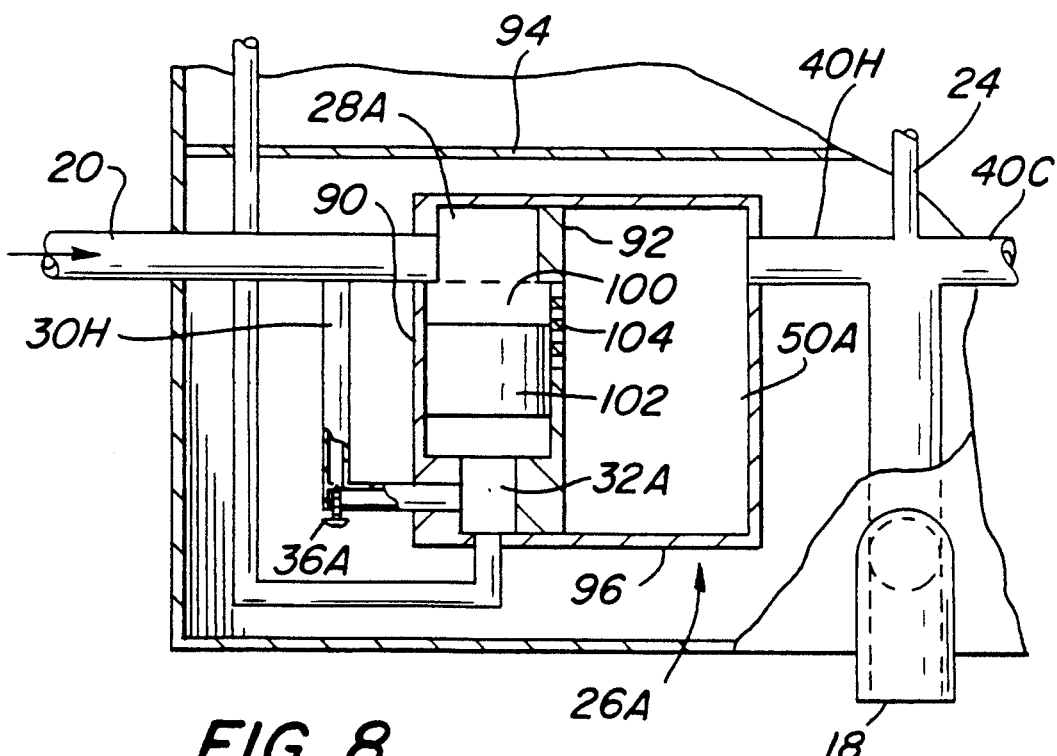
FIG. 8 is an alternate embodiment of the fluid flow regulator assembly of FIG. 3.

An alternate or second embodiment of the flow regulator assembly of FIG. 3 is depicted in FIG. 8. The character "A" will be used to denote similar elements in this embodiment to those described in the first embodiment. The main inflow and outflow conduits 20 and 40H are identically configured as in the first embodiment, as is the inflow bypass line 30A with its adjustable needle valve 36A for modulating fluid pressure (standing head) on the main fluid feed. The mid-wall 38H, horizontal perforated support means 44H and membrane 48H of the first embodiment (FIG. 3), have been supplanted by a piston-type, valving sub-assembly that is the functional equivalent of the first embodiment of the invention in regulator 26H.

An intermediate curvilinear partion wall 92 bridges the upper and lower walls 94 and 96 of regulator 26A. Inner partition wall 92 and regulator side wall 98 define the cylindrical main chamber 100 for a circular disc-like piston 102. The upper section of the inner partition wall 92 has multiple perforations 104, (similar to the perforations of support means 44) serving as flow ports. These flow ports permit fluid flow between the inflow chamber 28A and the larger outflow chamber 50A. Piston 102, as controlled by the fluid pressure in the valve chamber 32A, permits a controlled flow from the main fluid supply conduit 20 through an inlet chamber 28A and out through the flow ports 104 to the outlet chamber 50A. Fluid moving through needle valve 36A to chamber 32A biases the piston upwardly to partly or fully close the flow ports 104. At the upper end of its travel, piston 102 blocks all fluid flow from inlet chamber 28A (as shown by the lines drawn in phantom).

Just as with the flexible membrane valve of the first embodiment, the respective inflow and outflow rates, 20 and 40H, will establish an intermediate (equilibrium) position for the piston 102 between first and second sections of the main chamber 100 in accordance with the differential fluid pressures in variable volume chambers 28A and 32A. This will, in turn, modulate the volume of outflow from the regulator 26A to the faucet-connected conduit. The associated dials on the console 10 will determine the flow rate and temperature of the fluid flow to the faucet via conduit 40H.

Referring again to FIG. 2, in operation, when one of the central on-off valves 16, is in the off position (as shown in Group C), there is no fluid flow through valve 16C to the central flow conduit 24 connecting directly with faucet 18. At the same time, as to upstream dialable flow rate controller valves 12HC and 14CC (both hot and cold lines), there is no flow through them, as well. This condition also arrests flow through the common laterally located signal conduits 54C and 54H which are in fluid communication with the adjustable, fluid regulators 26C and 26H, respectively. As to the left side piping of FIG. 2, the lack of flow into signal conduit 54H creates a comparable reverse fluid pressure on the opposing faces of membrane 48H (an equilibrium), which will cause the membrane to remain seated upon support means 44H (as seen in phantom), impeding any fluid flow from exit chamber 50H to the faucet 18.

As a corollary, if needle valve 12 on signal flow line 54H were fully opened, reducing flow to main chamber 32H and the companion downstream on-off valve 16 is in the flow-through mode (Group A), then line water pressure entering upper variable volume chamber 28H of regulator 26H will create a pressure differential on membrane 48H (downwardly), separating the membrane from the support means 44H, and permitting the fully pressurized flow from main supply 20 through regulator 26H and exit conduit 40H direct to faucet 18.

Plural intermediate flow rates from the faucet are presetable with adjustments in each of the sequential needle valves located on either side of the panel. This is done by manually adjusting the apertures in downstream needle valves 12HC and 14CC (FIG. 2) most conveniently and frequently, rather than in bypass conduit valves 36H and 36C. Selection is made of a dial setting between "0" (no flow) and "7" (maximum flow). Recall that the main bypass line needle valve 36H aperture setting was preferably established at the time of initial installation of the control panel.

By way of further example, referring to FIG. 1, if dial 12 has been set at "3" (intermediate hot flow), while companion dial 14 has been left at "0" (no cold flow), upon moving central knob 16 to the "ON" position, fluid may escape through main hot effluent line 40H and the common line 24, being limited only by the medium flow rate setting "Hot" on dial 12.

More specifically, the fluid outflow from regulator 26H, via conduit 52H to the signal conduit 54H, which in turn is connected to open valves 12 and 16, creates a hydraulic pressure imbalance on membrane 48H, at least partially lifting it away from grating 44H and permitting fluid flow between main inflow compartment 28H and outflow chamber 50H into faucet 18. As the dual flow rates through regulator 26H are stabilized, they will create an equilibrium opposing hydraulic pressures on the membrane, retaining it in some intermediate flow configuration such as seen in FIG. 1.

The main conduit flow 40H will pass out of the faucet 18 unimpeded until some manual intervention occurs at the dials. Should the appropriate central valve 16 be closed, return line flow through main chamber 32H would stop and the hydraulic pressure buildup below the membrane 48H would bias it to seat fully over grating 44H, thus rather quickly stopping hot fluid flow from the faucet. The cold side regulator 26C functions identically.

Alternatively, should the on-off dial 16C be left open, but only the adjustable setting dial be moved back to "1" (less flow rate) or forward to "5" (higher flow rate), then the new pressure differential created on the membrane 48H would shift the position of its hydraulic equilibrium. The main stream flow would also be altered accordingly.

The foregoing sequence of flow adjustments is applicable whether the HOT or COLD controls are so adjusted, or at whichever level of the central group of dials it addressed, be it shave water, rinse water, or brush water flow rates. Mixing the dial settings on the cooperating group of valves will result in fluid flow temperatures between the hottest and the coolest, as is desired. The configuration of COLD side main flow controller 26C is the mirror image of that just described, being operated to vary the cold water feed to the device by manipulation of like components found therein and cooperating with the valving in the same manner.

The present invention may be embodied in other specific forms without departing from the spirit or essential attributes thereof, and accordingly, reference should be made to the appended claims, rather than to the foregoing specifications, as indicating the scope of the invention.

I claim:

1. A plural station, fluid flow rate and temperature control console adapted for cooperating with the standing hydraulic pressure of a dual temperature fluid supply means, comprising, in combination:

two main fluid supply conduits, a single fluid exit conduit interruptably connectable to both of said supply conduits, a variable effluent flow rate regulator interposed in each of the said main supply conduits, a bypass fluid supply conduit operably connected to each of the main fluid supply conduits and to the interposed flow rate regulators, an ancillary fluid outlet conduit connected to each regulator and serving as a signal control fluid supply means, and at least one associated controller means for presetting the flow rate through each regulator and determining both the degree of mixing and the incidence of the fluid flow to be provided from said fluid supply conduits to the exit conduit;

each of the flow rate regulators comprising a rigid impermeable main chamber connecting a first section thereof with one of the main fluid supply conduits, and also with said fluid exit conduit, said bypass fluid supply conduit being operably connected between each of said main supply conduits and a second section of the main chamber of the interposed flow rate regulators;

the main chamber being provided with first fluid valving means comprising an internally disposed, perforated support means upstream of said fluid exit conduit, a flexible fluid-impermeable membrane securely arranged across said main chamber separating said first and second sections thereof and adapted to seat sealingly, either fully or partially, over said perforated support means, said membrane being responsive to the differential pressures created on the opposing sides of said membrane by the dissimilar flow pressures from the main fluid supply conduit and the bypass fluid supply conduit;

the associated controller means is adapted for setting the regulator main flow rate, comprising a first multisetting flow valve means disposed downstream in the signal control fluid supply means, and a second valving means connectably disposed downstream of the first multisetting valve means, being adapted to only "ON" or "OFF" modes of operation; and said second valving means also being connected to a second companion multisetting flow valve means for the other signal control fluid supply means of the other main fluid supply and also to said main exit conduit, said second valving means serving as a common flow control valve for the mixed control fluid streams.

2. The console assembly of claim 1 wherein each of the flow rate regulators is provided with a manually adjustable needle valve located in the bypass fluid supply conduit for purposes of calibrating the desired pressure drop occurring in the supply fluid passing therethrough to the main chamber of said regulator.

3. The console assembly of claim 1 wherein the flexible membrane is composed of an elastomeric material resistant to high temperature fluid contact and to cyclical and flexible seating, and responsive to multiple pressure differentials exerted thereon.

4. The associated controller means of claim 1 comprising a manually adjustable, needle-throttle and orifice type valve with plural settings ranging from zero signal fluid flow to full signal fluid flow therethrough.

5. The associated controller means of claim 1 wherein said second valving means has a manually accessible knob for rotating the valve body between flow and no flow modes on demand.

6. The console assembly of claim 1 wherein there are at least two levels of associated controller means for setting the dual controller fluid flow rate, each level comprising two substantially identical multisetting flow valves and a single second valve means which is concurrently connected to the outlet conduits of said multisetting flow valves, the second valve also being operably connected with the main exit conduit of said console assembly.

7. The console assembly of claim 1 wherein one main supply line provides heated water adapted for residential use and the other main supply line provides cold water, the dissimilar water temperatures being balanced in the console assembly for a variety of use conditions, selectable when a corresponding "ON-OFF" control is activated.

8. A plural station, fluid flow rate and temperature control console adapted for cooperating with the standing hydraulic pressure of a dual temperature fluid supply means, comprising, in combination:

two main fluid supply conduits, a single fluid exit conduit interruptably connectable to both of said supply conduits, a variable effluent flow rate regulator interposed in each of the said main supply conduits, a bypass fluid supply conduit operably connected to each of the main fluid supply conduits and to the interposed flow rate regulators, an ancillary fluid outlet conduit connected to each regulator and serving as a signal control fluid supply means, and at least one associated controller means for presetting the flow rate through each regulator and determining both the degree of mixing and the incidence of the fluid flow to be provided from said fluid supply conduits to the exit conduit;

each of the flow rate regulators comprising a rigid impermeable main chamber connecting a first section thereof with one of the main fluid supply conduits, and also with said fluid exit conduit, said bypass fluid supply conduit being operably connected between each of said main supply conduits and a second section of the main chamber of the flow rate regulators;

the main chamber being provided with first fluid valving means comprising an internally disposed, perforated plate means located in a wall intermediate and separating the main fluid supply and fluid exit conduits, said wall forming a cylindrical compartment in cooperation with the main chamber sidewall enclosing a disk-like piston adapted to reciprocate in said cylindrical compartment between full-flow and no-flow positions relevant to one or more outflow ports in said perforated plate means, the position of the piston being responsive to the differential pressures created on the opposing planar surfaces of said piston by the dissimilar flow pressures from the main fluid supply conduit and the bypass fluid;

the associated controller means is adapted for setting the regulator main flow rate, comprising a first multisetting flow valve means disposed downstream in the signal control fluid supply means, and a second valving means connectably disposed downstream of the first multi-setting valve means, being adapted to only "ON" or "OFF" modes of operation; and said second valving means also being connected to a second companion multisetting flow valve means for the other signal control fluid supply means of the other main fluid supply and also to said main exit conduit, said second valving means serving as a common flow control valve for the mixed control fluid streams.

9. The console assembly of claim 8 wherein each of the flow controllers is provided with a manually adjustable needle valve located in the bypass fluid supply conduit for purposes of calibrating the desired pressure drop occurring in the supply fluid passing therethrough to the main chamber of said regulator.

10. The console assembly of claim 8 wherein the disk-like piston is composed of a plastic material resistant to high temperature fluid contact and to reciprocating frictional contact, and responsive to multiple pressure differentials exerted thereon.

11. The associated controller means of claim 8 comprising a manually adjustable needle-throttle and orifice type valve with plural settings ranging from zero signal fluid flow to full signal fluid flow therethrough.

12. The associated controller means of claim 8 wherein said second valving means has a manually accessible knob for rotating the valve body between flow and no flow modes on demand.

13. The console assembly of claim 8 wherein there are at least two levels of associated controller means for setting the dual controller fluid flow rate, each level comprising two substantially identical multisetting flow valves and single second valve means which is concurrently connected to the outlet conduits of said multisetting flow valves, the second valve also being operably connected with the main exit conduit of said console assembly.

14. The console assembly of claim 8 wherein one main supply line provides heated water adapted for residential use and the other main supply line provides cold water, the dissimilar water temperatures being balanced in the console assembly for a variety of use conditions, selectable when a corresponding "ON-OFF" control is activated.

* * * * *